United States Patent
Vargas, Jr. et al.

(10) Patent No.: US 9,069,595 B1
(45) Date of Patent: *Jun. 30, 2015

(54) SYSTEMS AND METHODS FOR OVERSEAS DESKTOP SOFTWARE

(71) Applicant: United Services Automobile Association (USAA), San Antonio, TX (US)

(72) Inventors: Miguel Vargas, Jr., San Antonio, TX (US); Michael J. Slaven, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/159,771

(22) Filed: Jan. 21, 2014

Related U.S. Application Data

(63) Continuation of application No. 12/259,760, filed on Oct. 28, 2008, now Pat. No. 8,635,613.

(51) Int. Cl.
G06F 9/455 (2006.01)
G06F 3/00 (2006.01)

(52) U.S. Cl.
CPC .................... G06F 9/45533 (2013.01)

(58) Field of Classification Search
None
See application file for complete search history.

(56) References Cited

U.S. PATENT DOCUMENTS

| | | |
|---|---|---|
| 6,138,153 A | 10/2000 | Collins, III et al. |
| 7,228,337 B1 | 6/2007 | Bornstein et al. |
| 7,401,112 B1 | 7/2008 | Matz et al. |
| 7,599,947 B1 | 10/2009 | Tolbert et al. |
| 8,635,613 B1 | 1/2014 | Vargas, Jr. et al. |
| 2004/0030739 A1 | 2/2004 | Yousefi'zadeh |
| 2005/0055678 A1 | 3/2005 | Sakai |
| 2007/0067373 A1 | 3/2007 | Higgins et al. |

(Continued)

OTHER PUBLICATIONS

R Feldmann et al., An Integrating Approach for Developing Distributed Software Systems [Retrieved on Aug. 26, 2008], Retrieved from the Internet <http://ieeexplore.ieee.org/iel5/6515/17399/00802850.pdf&>, 10 pgs.

*Primary Examiner* — William B Partridge
(74) *Attorney, Agent, or Firm* — Kane Kessler, P.C.; Barry E. Negrin

(57) ABSTRACT

A system, method, and computer-usable medium are disclosed for the packaging of software. A plurality of workflow modules is implemented for the management of software packaging operations. An admin workflow module is implemented on an administrator system, which determines a software package to be assigned to a remote user for software packaging operations. The assignment is then routed to a remote user workflow module implemented on the remote user's system. The admin workflow module determines the virtual machine (VM) configuration requirements of the software packaging operation. If an existing VM with the required configured is not available, then instructions are provided to a virtual machine manager (VMM) to generate a VM with the required configuration. The software package is then loaded and control of the VM is released to the remote user through a virtual private network (VPN) connection. The remote user then performs the assigned software packaging operation. Support resources, if required, are provided through a plurality of collaboration modules.

20 Claims, 7 Drawing Sheets

(56) References Cited

U.S. PATENT DOCUMENTS

| | | |
|---|---|---|
| 2007/0168962 A1 | 7/2007 | Heinke et al. |
| 2007/0240134 A1 | 10/2007 | Buragohain et al. |
| 2007/0240152 A1 | 10/2007 | Li et al. |
| 2007/0271552 A1 | 11/2007 | Pulley |
| 2008/0209414 A1 | 8/2008 | Stein |
| 2010/0205457 A1 | 8/2010 | Jogand-Coulomb et al. |

SYSTEMS AND METHODS FOR OVERSEAS DESKTOP SOFTWARE

CROSS REFERENCE TO RELATED APPLICATIONS

The present application is a continuation of U.S. patent application Ser. No. 12/259,760, filed Oct. 28, 2008, now U.S. Pat. No. 8,635,613, which describes exemplary methods and systems and is incorporated by reference in its entirety.

The present application is also related in subject matter to U.S. patent application Ser. No. 12/259,774, filed Oct. 28, 2008; and U.S. patent application Ser. No. 12/259,789, filed Oct. 28, 2008, which describe exemplary methods and systems and are incorporated by reference in entirety.

BACKGROUND

1. Field of the Disclosure

Embodiments of the disclosure relate in general to the field of computers and similar technologies, and in particular to software utilized in this field. Still more particularly, it provides a system, method, and computer-usable medium for the packaging of software.

2. Description of the Related Art

The complexity, and diversity, of today's information processing technologies continues to grow without abatement. Users and enterprises alike have an ever increasing need for personal computers, servers, and mobile devices that contain various installed software modules that include operating systems, utilities, applications, and device drivers. Typically, many of these software products come from different software vendors, although they may be combined into a "package" that comes either preinstalled on a system, or installable as a single process.

Such packages help automate the process of installing, upgrading, configuring, and removing software packages from a system, whether it is large or small, complex or simple. Unfortunately, interaction between different software components, even when they are provided by the same vendor, are often complex, difficult to manage, and contradictory. Furthermore, due to their respective interdependencies and their reliance on underlying hardware components, they may conflict with each other, causing a system to slow down, lock-up, or crash.

Identifying these interdependencies, and their potential affects can prove challenging, especially given the seemingly infinite number of system configurations available. For this reason, system manufacturers and vendors, as well as enterprises, make significant investments in an attempt to determine hardware and software combinations that are known to work and be stable. Nonetheless, such efforts are costly, time consuming, and error prone. As a result, outsourcing the production and testing of software packages has become commonplace. However, such outsourcing introduces its own set of attendant issues, which include securing access to corporate information assets. Another issue is providing properly configured systems for testing packages. All too often, outsourcers attempt to test software packages on internal machines, thinking "close enough" is "good enough." In addition, differences in time zones can make communication difficult between information technology professionals and outsourced resources, not to mention the management, sequencing, and prioritization of work processes.

BRIEF SUMMARY

A system, method, and computer-usable medium are disclosed for the packaging of software. In various embodiments, a plurality of workflow modules is implemented for the management of software packaging operations. In one embodiment, an "admin workflow module" is implemented on an administrator system, which determines a software package to be assigned to a remote user for software packaging operations. The assignment is then routed by the admin workflow module to a "remote user workflow module" implemented on the remote user's system.

The admin workflow module determines the virtual machine (VM) configuration requirements of the software packaging operation and then determines whether an existing VM is configured such that it meets the requirements of the software packaging operation. If not, then the admin workflow module provides instructions to a virtual machine manager (VMM) to generate a VM with the required configuration. The admin workflow module then provides instructions to the VMM to assign the VM to the software package to be used for software packaging operations. Then, in response to input entered by the remote user into a graphical user interface (GUI), the remote user workflow module submits a request to the admin workflow module to load the assigned software package on the VM. The admin workflow module then releases control of the VM to the remote user. In various embodiments, the remote user is provided a virtual private network (VPN) connection to interact with the VM. In one embodiment, the VM is allowed access to shares information and software package information, but the remote user is not. The remote user then performs the assigned software packaging operation.

In one embodiment, the remote user requests assistance from a support resource, outlining the packaging issue and the support resources required to resolve the issue. The remote user workflow module forwards the request to the admin workflow module, which then processes the request to determine applicable support resources. If applicable support resources are available, the admin workflow module then establishes a collaboration session between the remote user workflow module and a workflow module implemented on the support resource's system. In various embodiments, each of the various workflow modules comprises a collaboration module operable to support various collaboration methods, including telephony, email.IM. and remote desktop protocol (RDP). The remote user then uses one of the collaboration methods to collaborate with the support resource.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
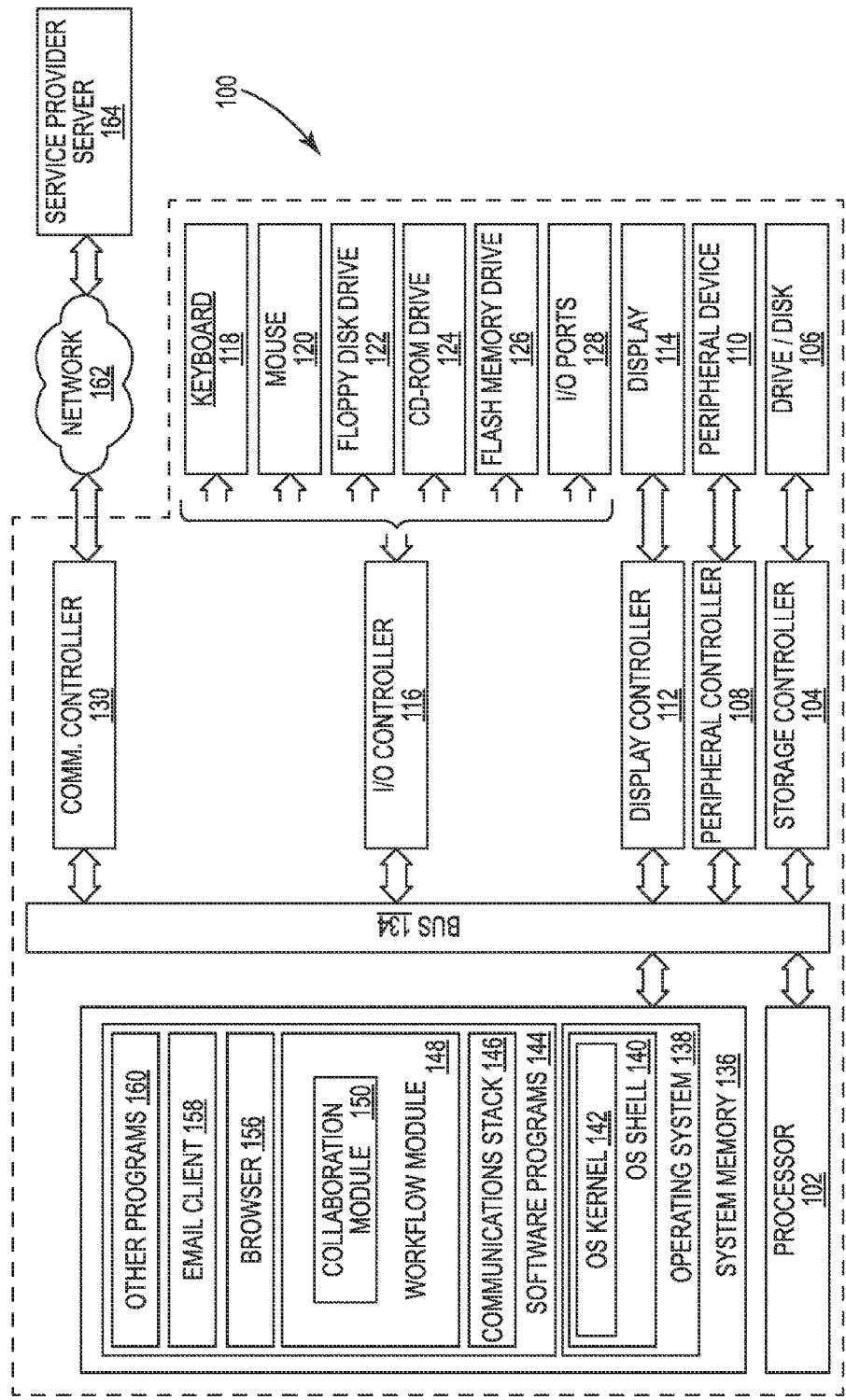
FIG. 1 depicts an exemplary client information processing system (IPS) in which embodiments of the disclosure may be implemented.

A method, system and computer-usable medium are disclosed for the packaging of software. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "COO programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a workflow module 148. In various embodiments, workflow module 148 further comprises a collaboration module 150. The workflow module 148 includes computer executable instructions for implementing the processes described in FIGS. 2-4 described hereinbelow. In one embodiment, client IPS 100 is able to download the computer executable instructions of the workflow module 148 from a service provider server 164 located at a remote location. In another embodiment, the computer executable instructions of the workflow module 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
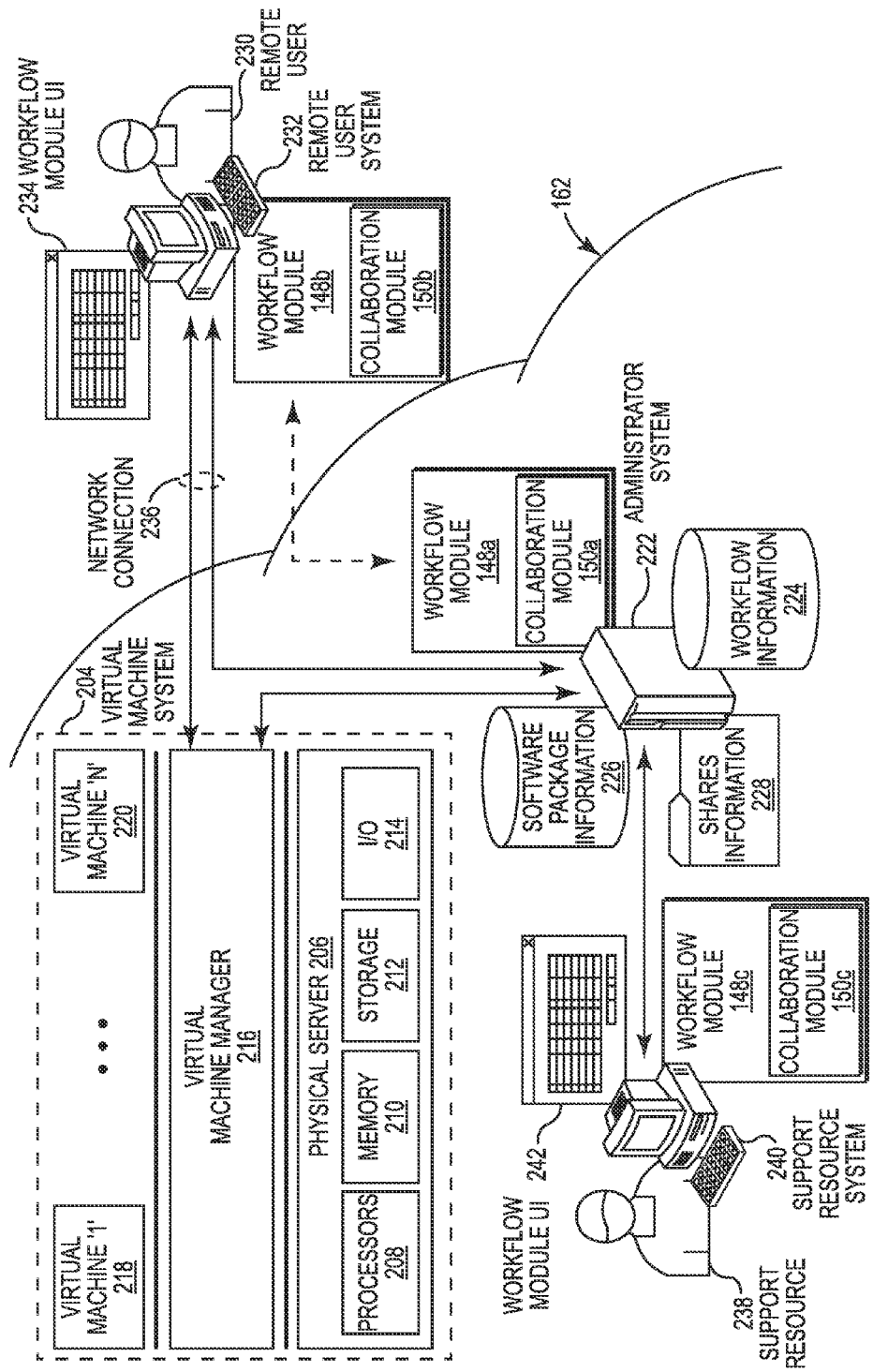
FIG. 2 is a simplified block diagram of a workflow module as implemented in accordance with an embodiment of the disclosure for the packaging of software.
Figure 3A:
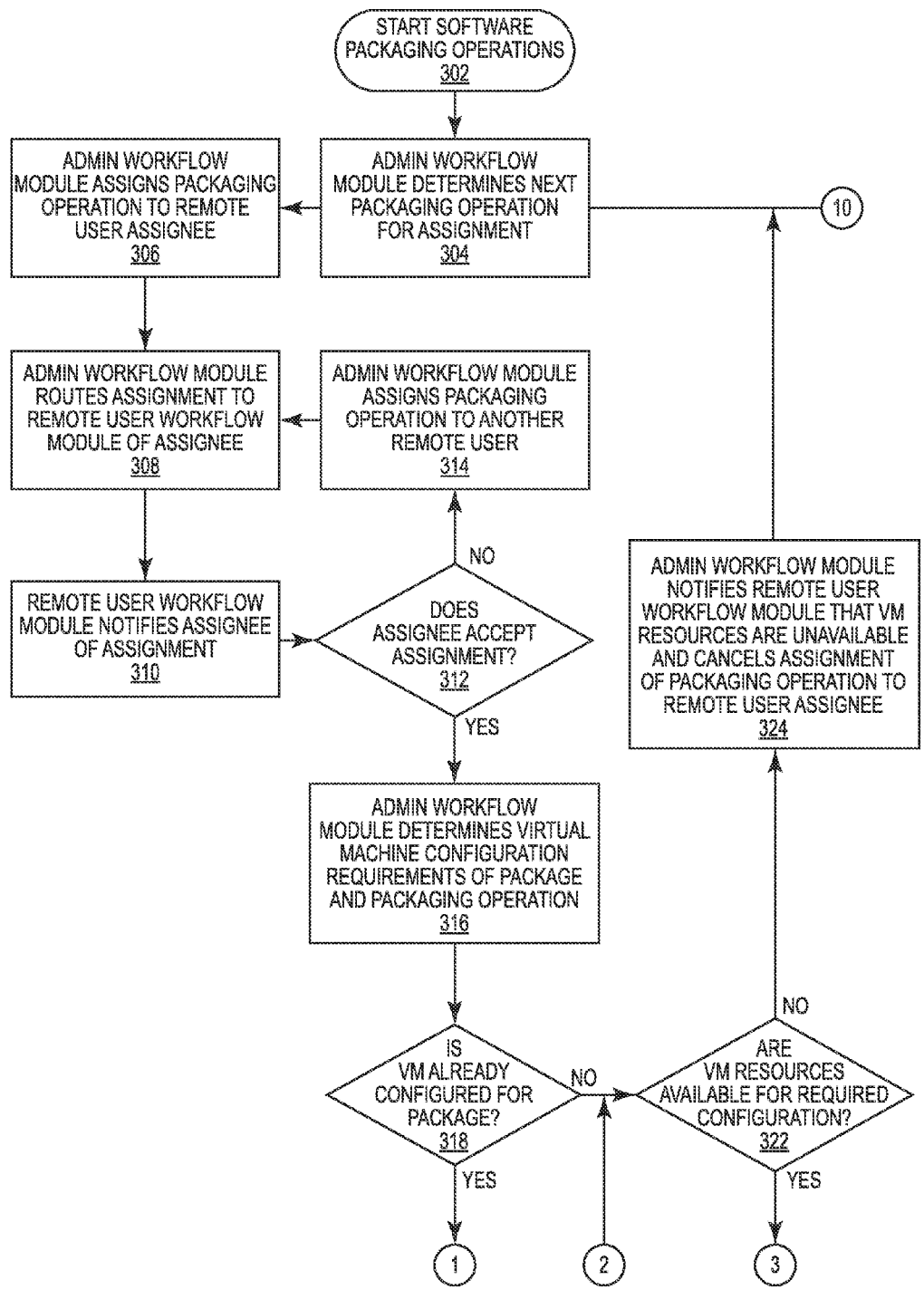
FIGS. 3a-d are a generalized flowchart of the operation of a workflow module as implemented in accordance with an embodiment of the disclosure for the packaging of software.
Figure 3B:
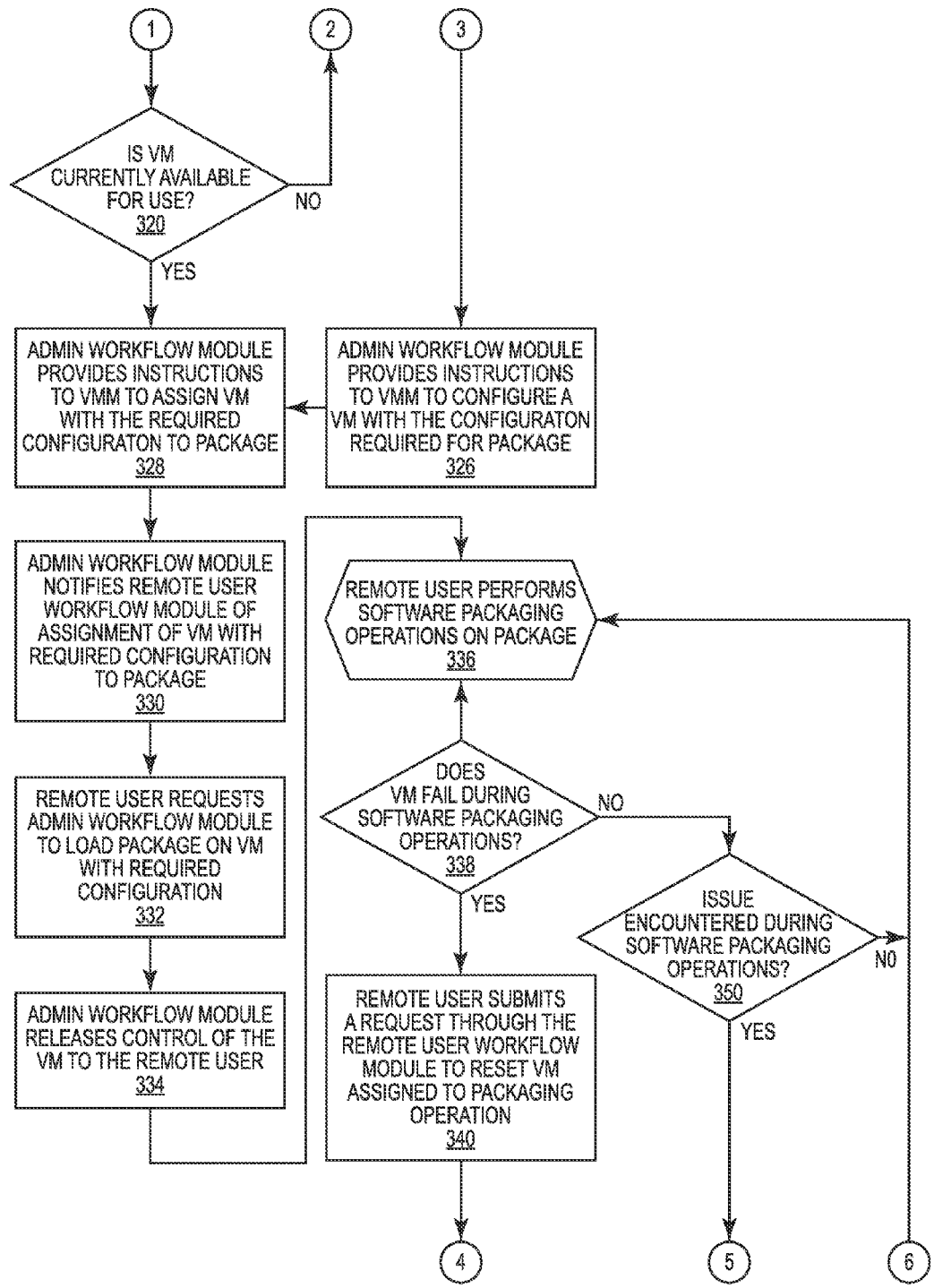
Figure 3C:
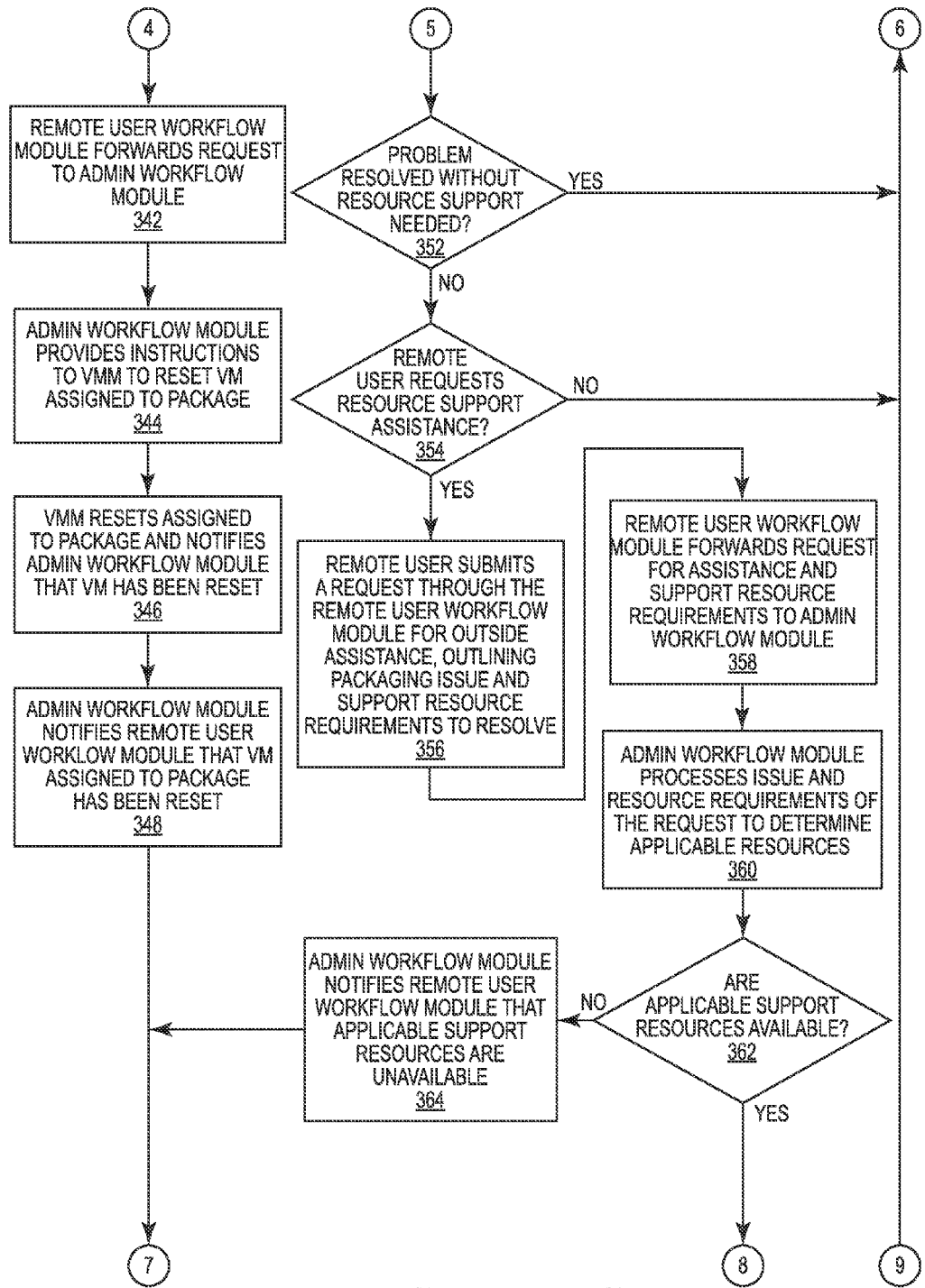
Figure 3D:
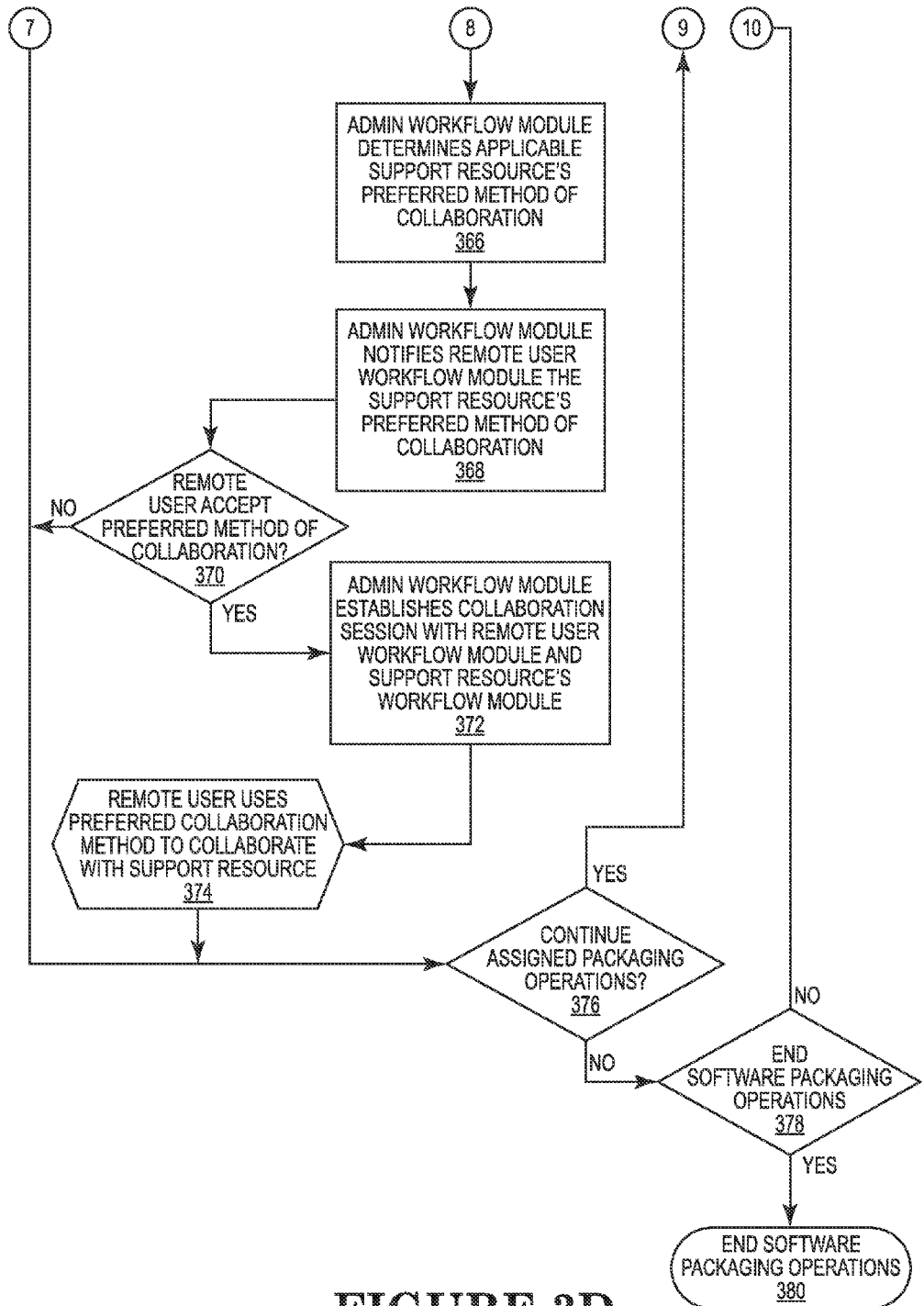

FIG. 2 is a simplified block diagram of a workflow module as implemented in accordance with an embodiment of the disclosure for the packaging of software. In various embodiments, one or more workflow modules 148*a*, 148*b*, 148*c*, are implemented to use workflow information 224 for the management of software packaging operations. In these embodiments, workflow information 224 comprises information to identify individual workflows, the prioritization of individual workflows within a workflow queue, information relating to individual workflow steps of an individual workflow, and workflow status information. In one embodiment, a workflow module (herein, the "admin workflow module") 148*a* is implemented on an administrator system 222. The admin workflow module determines a software package to be assigned to a predetermined remote user 230 for software packaging operations. As used herein, a software package refers to a combination of software modules or computer readable instructions "packaged" together for installation on a target system. The assignment is then routed by the admin workflow module 148*a* to a workflow module (herein, the "remote user workflow module") 148*b* implemented on the remote user's system 232. Once the assignment is received by the remote workflow module 148*b*, it then notifies the remote user of its receipt.

The admin workflow module 148*a* then determines the virtual machine (VM) configuration requirements of the software packaging operation. A determination is then made whether an existing VM, such as virtual machine '1' 218 through virtual machine 'n' 220, is configured such that it meets the requirements of the software packaging operation. If not, then the admin workflow module 148*a* provides instructions to a virtual machine manager (VMM) 216 to generate a VM with the configuration required by the software packaging operation. Those of skill in the art will be familiar with the operation of a VMM 216, also commonly referred to as a Hypervisor, which creates and manages virtual machines using the physical resources of a physical information processing system (IPS) 202. These physical resources include, but are not limited to, processors 208, memory 210, storage 212, and input/output I/O 206. Taken as a whole, the physical IPS 202, managed by the VMM 216 to create and manage VM '1' 218 through VM 'n' 220, provides a virtual machine system 204 for software packaging operations.

In various embodiments, the VMM 216 is operable to generate a predetermined VM 218,220, configure a predetermined VM 218, 220, load individual software packages on a predetermined VM 218, 220, and initiate the execution of the software package on the predetermined VM 218, 220. Likewise, the VMM 216 is operable to monitor the status of the execution of the software package on a predetermined VM 218, 220, reset a predetermined VM 218,220, and delete a predetermined VM 218,220. Accordingly, the VMM 216 is likewise able to provide information about each of the individual virtual machines 218, 220 it manages, including their configuration and status, to the admin workflow module 148*a*.

The admin workflow module 148*a* then uses software package information 226 to provide instructions to the VMM 216 to assign the VM 218, 220 with the configuration required by the software package to be used for software packaging operations. The admin workflow module 148*a* then notifies the remote workflow module 148*b* of the assignment of the VM 218, 220 with the configuration required by the software package and the software packaging operation. Then, in response to input entered by the remote user into a graphical user interface (GUI) 234, the remote user workflow module 148b submits a request to the admin workflow module 148a to load the assigned software package on the VM 218, 220 with the required configuration. The admin workflow module 148a then releases control of the VM 218, 220 to the remote user 230. It will be appreciated by those of skill in the art that one benefit of a VM 218, 220 is that it can allow the remote user 230 to perform predetermined activities while restricting the remote user from performing any activities beyond the confines of the VM 218, 220.

In various embodiments, the remote user 230 is provided a virtual private network (VPN) connection 236, through network 236, to interact with the VM 218, 220. In one embodiment, the VM 218, 220 is allowed access to shares information 226 and software package information 226, but the remote user 230 is not. The remote user 230 then performs the assigned software packaging operation. In one embodiment, the remote user 230 requests assistance from a support resource 238 through the GUI 234 of the remote user workflow module 148b, outlining the packaging issue and the support resources 238 required to resolve the issue. The remote user workflow module 14b then forwards the request to the admin workflow module 148a. The admin workflow module 148a then processes the request to determine support resources 238 that are applicable to the issue and its associated required resources.

If applicable support resources 238 are available, then the admin workflow module 148a determines the available support resource's 238 preferred method of collaboration. The admin workflow module 148a then establishes a collaboration session between the remote user workflow module 148b and a workflow module 148c implemented on the support resource's system 240. In various embodiments, the workflow module 148a, 114b, and 148c, respectively comprise a collaboration module 150a, 150b, and 150c, operable to support various collaboration methods, including telephony, email.IM. and remote desktop protocol (RDP). The remote user 230 then uses the preferred collaboration method to collaborate with the support resource in block 374.

FIGS. 3a-d are a generalized flowchart of the operation of a workflow module as implemented in accordance with an embodiment of the disclosure for the packaging of software. In various embodiments, one or more workflow modules are implemented to use workflow information for the management of software packaging operations. In these embodiments, workflow information comprises information to identify individual workflows, the prioritization of individual workflows within a workflow queue, information relating to individual workflow steps of an individual workflow, and workflow status information. In this embodiment, software packaging operations are begun in block 302. In block 304, a workflow module implemented on an administrator system (herein, the "admin workflow module") determines the next software package to be assigned to a predetermined remote user for software packaging operations. As used herein, a software package refers to a combination of software modules or computer readable instructions "packaged" together for installation on a target system. Skilled practitioners of the art will recognize that the term "package" is used broadly and can be applied to many different implementations. Accordingly, the use of the term "package" herein applies to its broadest interpretation. In block 306, the admin workflow module assigns the software packaging operation to a predetermined remote user. The assignment is then routed by the admin workflow module to a workflow module implemented on the remote user's system (herein, the "remote user workflow module") in block 308. Once the assignment is received by the remote workflow module, it then notifies the remote user assignee of its receipt in block 310.

A determination is then made in block 312 whether the remote user assignee accepts the assignment. If not, then the admin workflow module assigns the software package operation to another remote user in block 314 and the process continues, proceeding with block 308. Otherwise, the admin workflow module determines the virtual machine (VM) configuration requirements of the software packaging operation in block 316. A determination is then made in block 318 whether an existing VM is configured such that it meets the requirements of the software packaging operation. If so, then a determination is made in block 320 whether the existing VM is currently available for use. If not, then a determination is made in block 322 whether physical machine requirements are available for the VM configuration required by the software packaging operation. If not, then the admin workflow module notifies the remote user assignee in block 324 that VM resources are not available for the assigned software packaging operation and that the assignment has been canceled. The process then continues, proceeding with block 304.

However, if it is determined in block 322 that VM resources are available for the required VM configuration, then the admin workflow module provides instructions in block 326 to a virtual machine manager (VMM) to generate a VM with the configuration required by the software packaging operation. Those of skill in the art will be familiar with the operation of a VMM, also commonly referred to as a Hypervisor, which creates and manages virtual machines using the physical resources of an information processing system (IPS). In various embodiments, the VMM is operable to generate a predetermined VM, configure a predetermined VM, load individual software packages on a predetermined VM, and initiate the execution of the software package on the predetermined VM. Likewise, the VMM is operable to monitor the status of the execution of the software package on a predetermined VM, reset a predetermined VM, and delete a predetermined VM. Accordingly, the VMM is likewise able to provide information about each of the individual virtual machines it manages, including their configuration and status, to the admin workflow module.

The admin workflow module then provides instructions in block 328 to the VMM to assign the VM with the configuration required by the software package to be used for software packaging operations. Then, in block 330, the admin workflow module notifies the remote workflow module of the assignment of the VM with the configuration required by the software package and the software packaging operation. Then, in response to input entered by the remote user into a graphical user interface (GUI), the remote user workflow module submits a request in block 332 for the admin workflow module to load the assigned software package on the VM with the required configuration. The admin workflow module then releases control of the VM to the remote user in block 334. It will be appreciated by those of skill in the art that one benefit of a VM is that it can allow a remote user to perform predetermined activities while restricting the remote user from performing any activities beyond the confines of the VM.

The remote user then performs the assigned software packaging operation in block 336. A determination is then made in block 338 whether the VM fails during the software packaging operation. If so, then the remote user uses the GUI of the remote user workflow module in block 340 to submit a request to reset the VM assigned to the packaging operation. The remote user workflow module then forwards the VM reset request to the admin workflow module in block 342. Upon receipt of the VM reset request, the admin workflow module provides instructions in block 344 to the VMM to reset the VM assigned to the software package. The VMM then resets the VM assigned to the software package and notifies the admin workflow module in block 346 that the VM has been reset. The admin workflow module then notifies the remote user workflow module in block 348 that the VM assigned to the software package has been reset. A determination is then made in block 376 whether to continue the assigned packaging operation. If so, then the process continues, proceeding with block 336. If not, then a determination is made in block 378 whether to end software packaging operations. If not, then the process continues, proceeding with block 304. Otherwise software packaging operations are ended in block 380.

However, if it is determined in block 338 that the VM has not failed during software packaging, then a determination is made in block 350 whether the remote user encountered an issue during the assigned software packaging operation. If not, then the process continues, proceeding with block 336. If so, then a determination is made in block 352 whether the remote user was able to resolve the issue without assistance from a support resource. If so, then the process continues, proceeding with block 336. If not, then a determination is made in block 354 whether the remote user requests assistance from a support resource. If not, then the process continues, proceeding with block 336. If so, then the remote user submits a request for a support resource through the GUI of the remote user workflow module in block 356, outlining the packaging issue and the support resources required to resolve the issue. The remote user workflow module then forwards the request to the admin workflow module in block 358. The admin workflow module then processes the request in block 360 to determine support resources that are applicable to the issue and its associated required resources.

A determination is then made in block 362 whether the applicable support resources are available. If not, then the admin workflow module notifies the remote user module in block 364 that applicable resources are not available. The process then continues, proceeding with block 376. However, if it is determined in block 362 that the applicable support resources are available, then the admin workflow module determines the available support resource's preferred method of collaboration in block 366. As an example, a support resource may prefer to handle collaboration with remote users via electronic mail (email) due to differences in time zones. As another example, a support resource may be supporting multiple remote users concurrently and prefers collaborating via instant messaging (IM). As yet another example, the issue may require the participation of additional support resources, such as in a teleconference. It will be appreciated that many such collaboration methods are possible. In block 368, the admin workflow module notifies the remote workflow module of the available support resource's preferred method of collaboration. A determination is then made in block 370 whether the remote user accepts the available support resource's preferred method of collaboration. If not, then the process continues, proceeding with block 376.

However, if it is determined in block 370 that the remote user accepts the support resource's preferred method of collaboration, then the admin workflow module establishes a collaboration session between the remote user workflow module and a workflow module implemented on the support resource's system in block 370. In various embodiments, the workflow module comprises a collaboration module operable to support various collaboration methods, including telephony, email.IM. and remote desktop protocol (RDP). The remote user then uses the preferred collaboration method to collaborate with the support resource in block 374. A determination is then made in block 376 whether to continue the assigned packaging operation. If so, then the process continues, proceeding with block 336. If not, then a determination is made in block 378 whether to end software packaging operations. If not, then the process continues, proceeding with block 304. Otherwise software packaging operations are ended in block 380.

Figure 4:
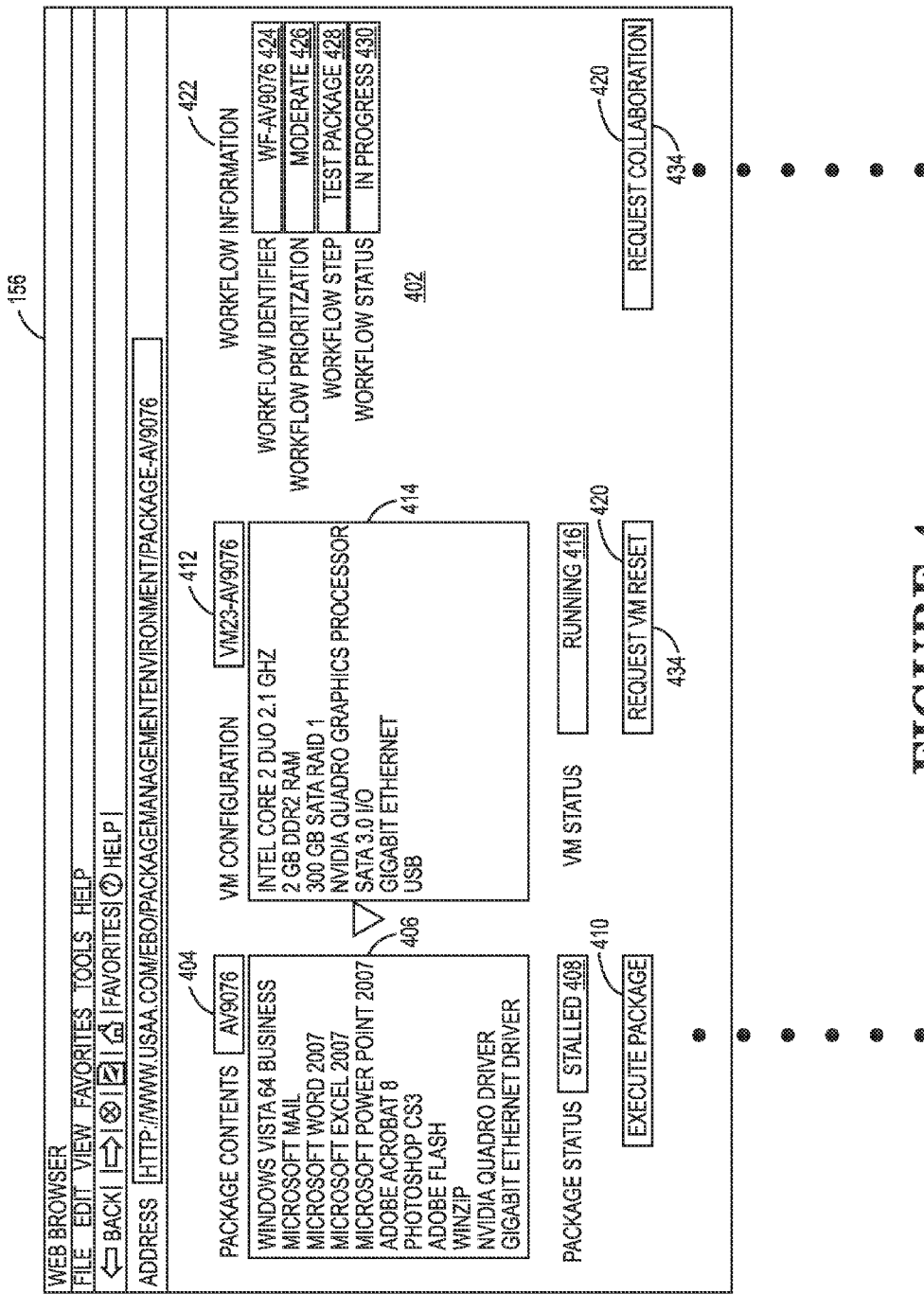
FIG. 4 is a simplified illustration of a workflow module as implemented in a window of a user interface in accordance with an embodiment of the disclosure.

FIG. 4 is a simplified illustration of a workflow module as implemented in a window of a user interface in accordance with an embodiment of the disclosure. In this embodiment, a workflow module is implemented in a workflow module window 402 of a graphical user interface of a browser 156. As illustrated in FIG. 4, the workflow module comprises a contents window 406, which displays the contents of a software package associated with a software package identifier 404. Likewise, a virtual machine (VM) configuration window 414 displays the configuration of a VM associated with VM identifier 412. In this embodiment, the VM associated with VM identifier "VM23-A V9076" is configured to execute the software package associated with software package identifier 404. The workflow module window 402 likewise comprises a package status wind 408, which indicates that the current status of the software package is "stalled." Likewise, VM status window 416 indicates that the current status of the VM is "running"

In addition, the workflow module window 402 comprises workflow information 422, further comprising a workflow identifier ("WF-AV9076") 424 and the priority of the workflow in a workflow queue ("Moderate") 426. The workflow information 422 likewise comprises the current workflow step ("Test Package") 428, and the status of the workflow ("In Progress") 430. In this embodiment, once a remote user is notified that a software package has been loaded on a predetermined VM, the remote user can initiate the execution of the software package by selecting Command Button "Execute Package" 410. In various embodiments, a VM executing a software package may become stalled and require a reset. In this embodiment, a remote user selects Command Button "Request VM Reset" 420 with a user gesture, such as with a mouse click with cursor 434. Likewise, if the remote user requires support assistance, it can be requested by the remote user selecting the Command Button "Request Collaboration" 432 with a similar user gesture with cursor 434 to initiate a collaboration session as described in greater detail herein.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A computer system for packaging software, comprising:
    a processor and memory;
    a database comprising software package information indexed to a plurality of software packages;
    a workflow module operable to manage a particular workflow corresponding to a particular software package of the plurality of software packages; and
    a graphical user interface (GUI) operable to receive user input and provide the user input to the database and the workflow module;
    wherein the particular software package is assigned to a predetermined virtual machine (VM), wherein execution of the particular software package is initiated by a remote user that has access to the predetermined VM through a virtual network, and wherein the predetermined VM has access to software package information corresponding to the particular software package but the remote user does not.

2. The system of claim 1, wherein the GUI is further operable to display the software package information corresponding to the particular software package, workflow information corresponding to the particular software package, and said VM information corresponding to the particular software package.

3. The system of claim 1, wherein the GUI is further operable to receive user input and provide the user input to an information processing system (IPS) virtual machine manager (VMM) to manage the predetermined virtual machine.

4. The system of claim 3, wherein the management of the predetermined virtual machine comprises at least one of:
    generating the predetermined VM;
    configuring the predetermined VM;
    loading the particular software package on said predetermined VM;
    initiating the execution of the particular software package on the predetermined VM;
    monitoring the status of the execution on the predetermined VM;
    resetting the predetermined VM; or
    deleting the predetermined VM.

5. The system of claim 3, wherein the VM information comprises VM configuration information and VM status information.

6. A computer-implementable method for packaging software, comprising:
    using a database comprising software package information indexed to a plurality of particular software packages;
    using a workflow module operable to manage an particular workflow corresponding to an particular software package; and
    using an admin workflow module to release control of a predetermined virtual machine (VM) to a remote user via a virtual network;
    wherein the particular software package is assigned to the predetermined virtual machine (VM), wherein execution of the particular software package is initiated by the remote user, and wherein the predetermined VM has access to the software package information but the remote user does not.

7. The method of claim 6, further comprising using a graphical user interface (GUI) operable to receive user input and provide said user input to said database and said workflow module.

8. The method of claim 6, further comprising determining VM configuration requirements of the execution of the particular software package.

9. The method of claim 6, further comprising determining whether a VM exists that meets the requirements of the execution of the particular software package.

10. The method of claim 6, further comprising creating the predetermined VM if it is determined that the VM that meets the requirements of the execution of the particular software package does not exist.

11. The method of claim 6, further comprising further comprising determining whether the predetermined VM that already exists is available for use.

12. A non-transitory computer-readable medium storing instructions, the instructions comprising computer executable instructions executed to:
   provide a database comprising software package information indexed to a plurality of particular software packages;
   manage an particular workflow corresponding to an particular software package;
   receive, via a graphical user interface (GUI), user input and provide the user input to the database and a workflow module;
   assign the particular software package to a predetermined virtual machine (VM);
   provide a remote user with access to the predetermined VM through a virtual network, wherein the predetermined VM has access to the software packaging information but the remote user does not; and
   initiate, by the remote user, execution of the particular software package using the software package information.

13. The computer-readable medium of claim 12, wherein the particular software package includes a number of software modules or computer readable instructions packaged together for installation on a target system.

14. The computer-readable medium of claim 12, wherein assign the particular software package to the predetermined (VM) includes computer executable instructions to load the particular software package on the predetermined VM.

15. The computer-readable medium of claim 12, wherein initiate execution of the particular software package includes computer executable instructions to executing a software packaging operation based on a request from the remote user for assistance with packaging issues.

16. The computer-readable medium of claim 12, further including computer executable instructions to establish a collaboration session between the remote user and a support resource.

17. The computer usable medium of claim 12, wherein the computer executable instructions are provided to a client computer from a server, wherein said server is located at a remote location.

18. The computer usable medium of claim 12, wherein the computer executable instructions are provided as a service on an on-demand basis, wherein said service is provided by a service provider.

19. The computer usable medium of claim 12, wherein the predefined VM uses the software package information to execute said particular software package.

20. the computer usable medium of claim 12, wherein providing the remote user with access to the predetermined VM allows the remote user to perform predetermined activities while restricting the remote user from performing any activities beyond the confines of the VM.

* * * * *